(12) United States Patent
Schacherer et al.

(10) Patent No.: US 10,352,199 B2
(45) Date of Patent: Jul. 16, 2019

(54) CAMSHAFT

(71) Applicant: Mahle International GmbH, Stuttgart (DE)

(72) Inventors: Roland Schacherer, Geisingen (DE); Christoph Unrath, Urbach (DE)

(73) Assignee: Mahle International GmbH (DE)

( * ) Notice: Subject to any disclaimer, the term of this patent is extended or adjusted under 35 U.S.C. 154(b) by 15 days.

(21) Appl. No.: 15/344,242

(22) Filed: Nov. 4, 2016

(65) Prior Publication Data

US 2017/0130615 A1 May 11, 2017

(51) Int. Cl.
*F01L 1/047* (2006.01)
*F16H 53/02* (2006.01)
*F16H 53/04* (2006.01)

(52) U.S. Cl.
CPC ............ *F01L 1/047* (2013.01); *F16H 53/025* (2013.01); *F16H 53/04* (2013.01); *F01L 2001/0473* (2013.01)

(58) Field of Classification Search
CPC . F01L 1/047; F01L 2001/0473; F16H 53/025; F16H 53/04
See application file for complete search history.

(56) References Cited

U.S. PATENT DOCUMENTS

| 5,052,845 A * | 10/1991 | Maus ................... B21D 39/203 29/523 |
| 7,802,549 B2 * | 9/2010 | Schneider ............... F01L 1/047 123/90.44 |
| 9,845,858 B2 * | 12/2017 | Unrath .................. F16H 53/025 |
| 2006/0060159 A1 | 3/2006 | Moretz et al. |
| 2016/0273639 A1 | 9/2016 | Unrath |

FOREIGN PATENT DOCUMENTS

| DE | 19825814 A1 | 12/1998 | |
| DE | 102012220652 A1 | 5/2014 | |
| EP | 1963625 A1 | 9/2008 | |
| WO | WO-2014075908 A1 * | 5/2014 | ............ F01L 1/3442 |

OTHER PUBLICATIONS

European Search Report dated Mar. 10, 2017 for EP Application No. 16195526.5.

* cited by examiner

*Primary Examiner* — Vicky A Johnson
(74) *Attorney, Agent, or Firm* — Fishman Stewart PLLC

(57) ABSTRACT

A camshaft may include a tube-like outer shaft and an inner shaft arranged coaxially thereto and at least partially rotatable with respect to the outer shaft. The inner shaft may have an end section with a reduced external diameter. The inner shaft may be sealed with respect to the outer shaft at the end section.

7 Claims, 2 Drawing Sheets

CAMSHAFT

CROSS-REFERENCE TO RELATED APPLICATIONS

This application claims priority to German Patent Application No. DE 10 2015 221 868.6, filed on Nov. 6, 2015, the contents of which are hereby incorporated by reference in its entirety.

TECHNICAL FIELD

The present invention relates to a camshaft with a tube-like outer shaft and with an inner shaft, arranged coaxially thereto and rotatable with respect to the outer shaft at least in a limited manner. The invention further relates to an internal combustion engine with at least one such camshaft.

BACKGROUND

From EP 1 963 625 B1 a generic camshaft is known, with an outer shaft and with an inner shaft, arranged coaxially thereto, rotatable with respect to the outer shaft at least in a limited manner.

Owing to the necessary freedom of movement between the inner shaft and the outer shaft in an adjustable camshaft or respectively also owing to a necessary conveying of oil for a phase adjuster or respectively a bearing lubrication, usually an annular gap with a radial height of 0.2 mm to 2 mm is provided between the inner shaft and the outer shaft. A seal at the end of the two shafts is necessary here, in order to be able to build up and hold the oil pressure, necessary for the phase adjuster, between the inner shaft and the outer shaft. In inner shafts known from the prior art, these are, for example, thickened in the region of a sealing ring, which can be achieved for example by a material removal on almost the complete length of the inner shaft adjacent to the sealing ring. However, this is comparatively expensive.

SUMMARY

The present invention is therefore concerned with the problem of indicating for a camshaft of the generic type an improved or at least an alternative embodiment, which is distinguished in particular by a seal which is more economically priced and is easier to install between an inner shaft and outer shaft.

This problem is solved according to the invention by the subject of the independent claims. Advantageous embodiments are the subject of the dependent claims.

The present invention is based on the general idea of turning an inner shaft on an end section, i.e. providing the inner shaft in this end section with a reduced external diameter and, after installation into an outer shaft, undertaking a seal of the inner shaft with respect to the outer shaft via this end section. The end section of the inner shaft, which is reduced with regard to its external diameter, can be constructed here in one piece with the inner shaft or as an additional pin and joined to the inner shaft. The camshaft according to the invention has here a tube-like outer shaft and, in installed state, the inner shaft, arranged coaxially thereto and rotatable with respect to the outer shaft at least in a limited manner. By the end section, reduced with regard to its external diameter, the processing effort of the inner shaft can be distinctly reduced in particular compared to inner shafts known from the prior art, in which the entire remainder had to be machined, and in addition the installation of the camshaft according to the invention can also be distinctly simplified, because a sealing ring arranged on the end section, which is reduced with regard to its external diameter, does not come in contact with an inner surface area of the outer shaft on inserting of the inner shaft into the outer shaft, and can therefore be inserted distinctly more easily and in particular also without the risk of damaging the sealing ring. A seal of the inner shaft with respect to the outer shaft takes place here for example by an end section of the outer shaft, reduced with regard to its internal diameter in the region of the end section of the inner shaft, wherein this end section of the outer shaft can be formed for example by upsetting thereof, i.e. in one piece with the outer shaft, or else by means of an additional component, for example by means of a plug.

In an advantageous further development of the solution according to the invention, the outer shaft has at least one radially inwardly projecting annular shoulder, via which the inner shaft is sealed with respect to the outer shaft. Consequently, the outer shaft is partially thickened only in these regions in contact with the end section of the inner shaft, namely by the radially inwardly projecting annular shoulder, wherein the expenditure for the production of this radial shoulder during production of the outer shaft is extremely small. This annular shoulder can be produced for example by a forming process, in particular by an upsetting or during the drawing of the outer shaft by push-pull forming. Depending on the radial thickness of the annular shoulder according to the invention, the latter is even able to receive and bear a sealing ring, for example in a corresponding groove.

In an advantageous further development of the solution according to the invention, the inner shaft has an outwardly open groove, in particular a circumferential groove, in which a sealing ring is arranged, which when the camshaft is installed is arranged at axial height of the end section and in particular also of the previously described annular shoulder. Hereby, it is possible for example to pre-assemble the sealing ring already on the end section of the inner shaft which is reduced with regard to its external diameter, and to subsequently insert it into the associated outer shaft, wherein it only comes into contact with the outer shaft at the last moment with its end section which is reduced with regard to its internal diameter, and in so doing the sealing ring is clamped between the end section of the outer shaft and the end section of the inner shaft.

In an advantageous further development of the solution according to the invention, a plug is provided, which engages on the longitudinal end side into the outer shaft and with respect to which the inner shaft is sealed. Such a plug in fact constitutes a separate component compared to an annular shoulder produced in one piece with the outer shaft, but is able to be produced comparatively simply, with high quality and also at an economical price.

Expediently, the plug can be securely connected with the outer shaft, in particular pressed, bonded, welded or soldered. This not non-exclusive list already outlines what a variety of possibilities exist for fastening the plug on the outer shaft.

In an advantageous further development of the solution according to the invention, the at least one annular shoulder has chamfered edges. Such chamfered edges facilitate an inserting of the inner shaft and hence the installation of the camshaft. Additionally or alternatively, the inner shaft has at at least one end an introduction bevel, which likewise facilitates an inserting of the inner shaft into to the outer shaft on installation of the camshaft.

Expediently, the annular gap has a radial thickness of 0.2 to 2.0 mm between inner shaft and outer shaft. In order to be able to hold a sufficient oil volume in the annular gap, for example for the lubrication of sliding bearings or respectively for the actuation of a phase adjuster, the described annular gap is provided between the inner shaft and the outer shaft. The annular gap serves here in particular as an oil conduit.

Further important features and advantages of the invention will emerge from the subclaims, from the drawings and from the associated figure description with the aid of the drawings.

It shall be understood that the features mentioned above and to be explained further below are able to be used not only in the respectively indicated combination, but also in other combinations or in isolation, without departing from the scope of the present invention.

Preferred example embodiments of the invention are illustrated in the drawings and are explained further in the following description, wherein the same reference numbers refer to identical or similar or functionally identical components.

BRIEF DESCRIPTION OF THE DRAWINGS

There are shown here, respectively diagrammatically.

DETAILED DESCRIPTION

Figure 1:
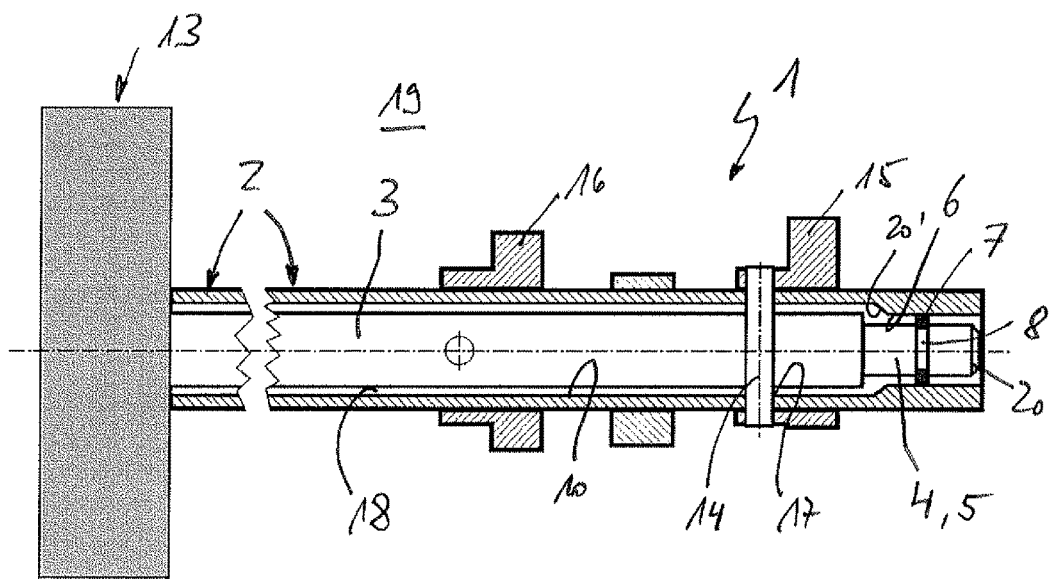
FIG. 1 a sectional illustration through a camshaft according to the invention.

According to FIGS. 1 to 4, a camshaft 1 according to the invention has a tube-like outer shaft 2 and an inner shaft 3, arranged coaxially thereto and rotatable with respect to the outer shaft 2 at least in a limited manner. According to the invention, the inner shaft 3 has a reduced end section 4 with regard to its external diameter, via which end section the inner shaft 3 is sealed with respect to the outer shaft 2. This end section 4 can be formed here either in one piece with the inner shaft 3, for example by processing by machining, i.e. a turning of the end section 4. Alternatively, it is also conceivable that the end section 4 is formed as a separate component, namely as a pin 5, and is securely connected with the inner shaft 3, for example bonded, pressed in, welded or soldered.

Figure 2:
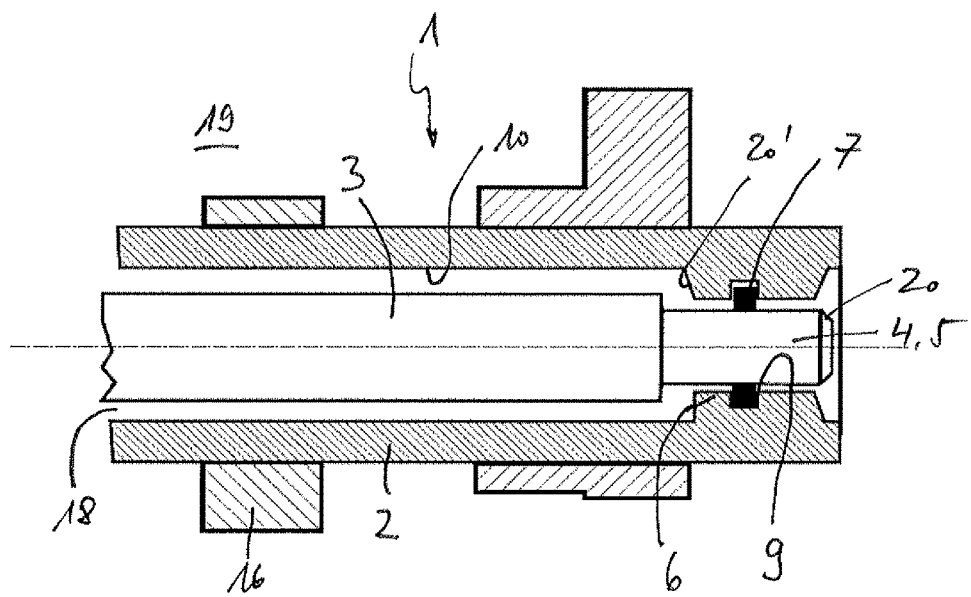
FIG. 2 likewise a sectional illustration through a camshaft according to the invention, with an altered end section of the outer shaft compared to FIG. 1, FIG. 3 an illustration as in FIG. 2, but with a plug, FIG. 4 an illustration as in FIG. 3, but with a different plug.

Observing FIGS. 1 and 2, it can be seen that the outer shaft 2 has in the region of the end section 4 of the inner shaft 3 a radially inwardly projecting annular shoulder 6, via which the inner shaft 3 is sealed with respect to the outer shaft 2. Here, a sealing ring 7 is arranged between the inner shaft 3 and the outer shaft 2.

This sealing ring 7 can be arranged here optionally in a groove 8 of the inner shaft 3, which groove is open toward the exterior (cf. FIG. 1), or else in a groove 9 in the outer shaft 2, which groove is open toward the interior (cf. FIG. 2). By the reduced external diameter of the inner shaft 3 in the region of the end section 4 and the arrangement of the sealing ring 7 there, a simplified installation of the camshaft 1 according to the invention can be achieved, because on inserting of the inner shaft 3 into the outer shaft 2, the sealing ring 7 at no time comes into contact with an inner surface area 10 of the outer shaft 2 and can be damaged there for example on pushing over elongated holes provided in the outer shaft 2. The production of the end section 4, which is reduced with regard to its external diameter, or respectively the arranging of the pin 5 onto the inner shaft 3 in addition constitutes a processing step which is comparatively simple and is able to be carried out quickly.

Figure 3:
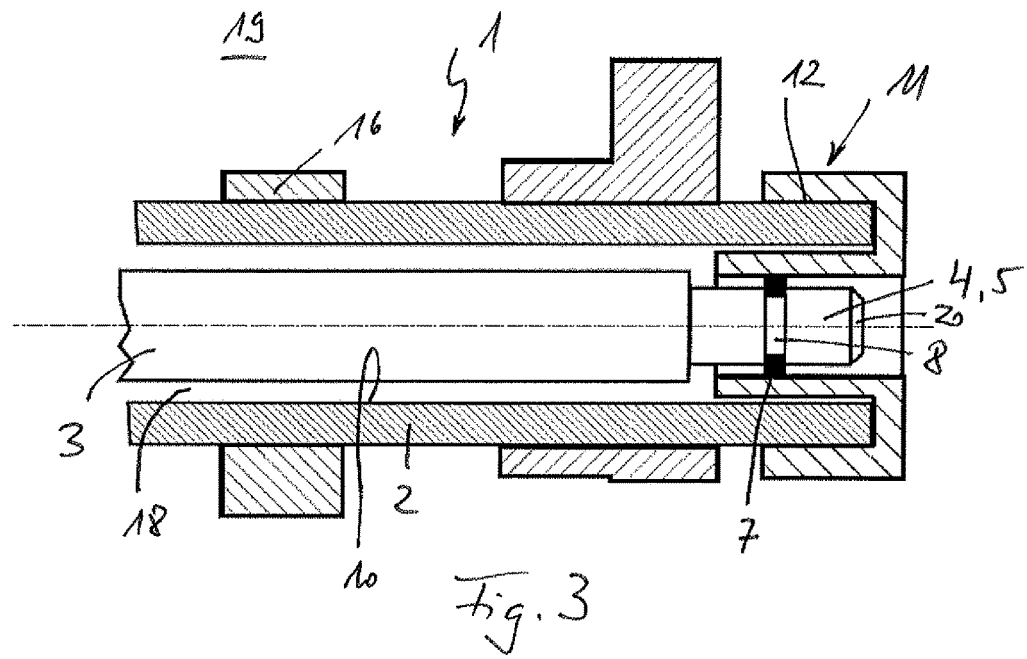
Figure 4:
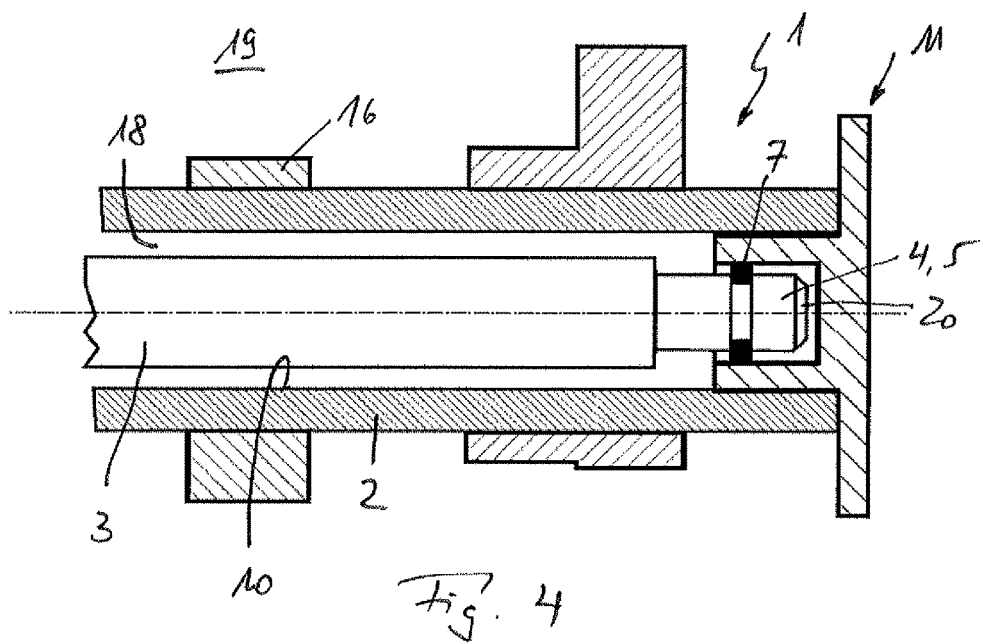

Observing FIGS. 3 and 4, it can be seen that in the case of the camshafts 1 shown there, a plug 11 is provided, which engages on the longitudinal end side into the outer shaft 2 and with respect to which the inner shaft 3 is sealed by the respective sealing ring 7. Observing here the plug 11 according to FIG. 3, it can be seen that it encompasses an outer edge 12 of the outer shaft 2, wherein a fastening of the plug 11 on/in the outer shaft 2 can take place for example by means of pressing, bonding, welding or soldering. The plug 11 according to FIG. 4 is constructed in a closed manner, so that in this case the sealing ring 7 can also be used as a bearing ring.

Observing FIG. 1 again, a phase adjuster 13 can be seen here on the left edge, which phase adjuster is used in a known manner for the relative rotation of the inner shaft 3 to the outer shaft 2, wherein the inner shaft 3 is usually connected by means of a pin 14 in a torque-proof manner with a first cam 15 and the outer shaft 2 is connected in a torque-proof manner with at least a second cam 16. In the outer shaft 2, an elongated hole 17, extending in circumferential direction, is provided here at the axial height of the pin 14, in which elongated hole the pin 14 is guided on a relative rotation of the inner shaft 3 to the outer shaft 2.

To supply the phase adjuster 13 with oil, an annular gap 18 is arranged between the inner shaft 3 and the outer shaft 2, which annular gap is sealed at the longitudinal end region of the camshaft 1 facing away from the phase adjuster 13 by means of the sealing ring 7. This sealing ring 7 cooperates here with the end section 4 of the inner shaft 3 which is reduced with regard to its external diameter. The annular shoulder 6 (cf. FIGS. 1 and 2) can be produced for example by a forming process, in particular by an upsetting or during the drawing of the outer shaft 2 by a push-pull forming, comparatively simply and at an economical cost.

Observing the sealing ring 7, the latter is usually formed from a plastic, in particular from an elastomer or from a polytetrafluoroethylene (PTFE), wherein of course also metallic sealing rings are conceivable. The sealing ring 7 is able here to also tolerate the chemical environment within the camshaft 1 in the long term, likewise the temperatures occurring during operation of an internal combustion engine 19 carrying the camshaft 1.

Observing the end section 4 of the inner shaft 3 more precisely, it can be seen that said end section has at a free end the chamfer 20, which is intended to simplify an inserting of the inner shaft 3 into the outer shaft 2. Likewise, such a chamfer 20' is arranged for example in the region of the annular shoulder 6 (cf. FIGS. 1 and 2). Alternatively to the plug 11 shown according to FIGS. 3 and 4, of course a sleeve, which is not illustrated, can also be used, which is pushed onto the outer surface area 12 of the outer shaft 2 and is fixed there, and at the same time has a central bore, in which, when the camshaft 1 is installed, the end section 4 of the inner shaft 3 is received.

Generally with the camshaft 1 according to the invention, both the installation thereof can be simplified, and also a seal of an annular gap 18 between the inner shaft 3 and the outer shaft 2 can be realized at a more favourable cost.

The invention claimed is:

1. A camshaft comprising an outer shaft and an inner shaft arranged coaxially thereto and at least partially rotatable with respect to the outer shaft;
   wherein the outer shaft is tubular and has a radially inwardly projecting annular shoulder located at a distal end of the outer shaft; and
   wherein the inner shaft has an end section with a reduced external diameter facing the annular shoulder, the inner shaft being sealed with respect to the outer shaft at the end section.

2. The camshaft according to claim 1, further comprising a sealing ring arranged between the inner shaft and the outer shaft.

3. The camshaft according to claim 2, wherein the sealing ring is formed from one of an elastomer and polytetrafluoroethylene (PTFE).

4. The camshaft according to claim 1, wherein the outer shaft has in a region of the annular shoulder an inwardly open groove in which a sealing ring is arranged.

5. The camshaft according to claim 1, wherein the inner shaft has an outwardly open groove in which a sealing ring is arranged, the outwardly open groove being aligned with a region of the annular shoulder.

6. The camshaft according to claim 1, wherein at least one of:
   the annular shoulder is produced by forming the outer shaft, and
   the end section is produced by machining.

7. A camshaft comprising:
   a tubular outer shaft; and
   an inner shaft arranged coaxially with the outer shaft and at least partially rotatable with respect to the outer shaft, the inner shaft having an end section with a reduced external diameter;
   wherein the outer shaft has a radially inwardly projecting annular shoulder to which the inner shaft is sealed with respect to the outer shaft, the inner shaft being sealed to the annular shoulder; and
   wherein the inner shaft has an outwardly open groove in the end section in which a sealing ring is arranged, the outwardly open groove being aligned with a region of the annular shoulder.

* * * * *